B. LJUNGSTRÖM.
SHAFT PACKING.
APPLICATION FILED MAR. 6, 1911.
1,009,425.
Patented Nov. 21, 1911.
2 SHEETS—SHEET 1.
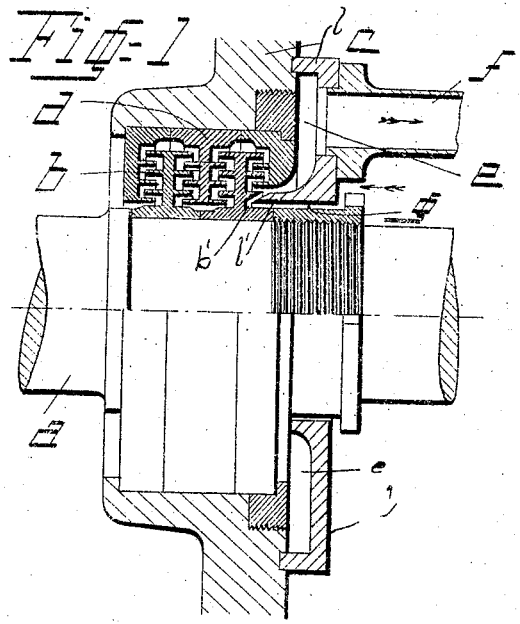
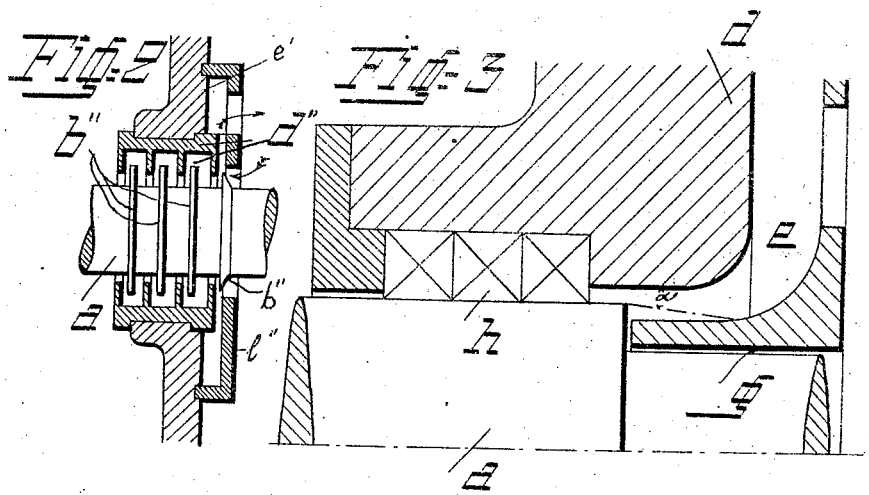
WITNESSES:
INVENTOR
Birger Ljungström
BY
Charles N. Butler
ATTORNEY.

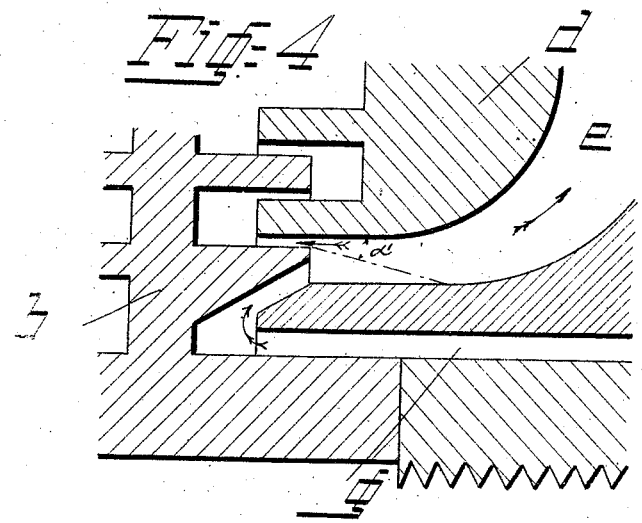
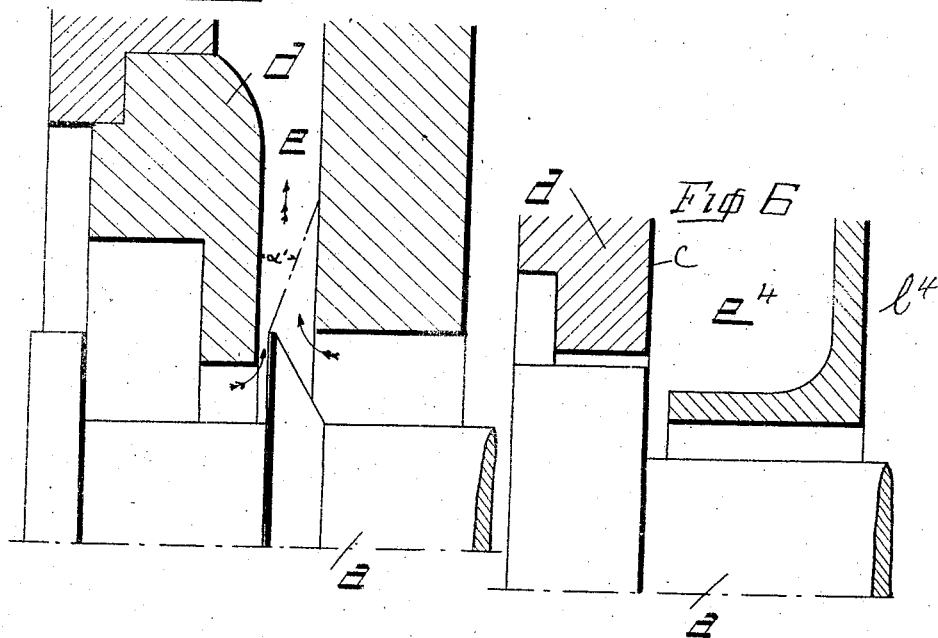

UNITED STATES PATENT OFFICE.

BIRGER LJUNGSTRÖM, OF STOCKHOLM, SWEDEN, ASSIGNOR TO AKTIEBOLAGET LJUNG-STRÖMS ANGTURBIN, OF STOCKHOLM, SWEDEN.

SHAFT-PACKING.

1,009,425.  Specification of Letters Patent.  Patented Nov. 21, 1911.

Application filed March 6, 1911. Serial No. 612,440.

*To all whom it may concern:*

Be it known that I, BIRGER LJUNGSTRÖM, engineer, a subject of the King of Sweden, and a citizen of Sweden, residing at 18 Grefmagnigatan, Stockholm, in the Kingdom of Sweden, have invented new and useful Improvements in Shaft-Packings, of which the following is a specification.

My invention is designed to control and carry away the steam or other motive fluid escaping through the shaft packings of turbines, pumps, compressors and the like, so as to prevent the escape of such fluids into the engine room.

It comprises the combination of a suitable packing with means whereby such fluid as escapes through the packing is subject to the resistance of and must escape through a contracted inlet to a discharge passage into which air may be drawn by the suction thus created.

In the accompanying drawings, which illustrate several forms of my invention, Figure 1 is a longitudinal sectional elevation of parts of a turbine shaft and casing having my improvements applied thereto; Fig. 2 is a similar view showing a different form of packing; Fig. 3 is a sectional view of apparatus having a further form of packing; Fig. 4 is an enlarged view of parts shown in Fig. 1 forming an injector; Fig. 5 is an enlarged view of parts shown in Fig. 2 forming an injector; and Fig. 6 is a longitudinal sectional view of an unpacked shaft and surrounding parts.

As shown in Figs. 1 and 4, the shaft $a$ and casing $c$ have thereon complementary flanged rings $b$ and $d$ forming a tortuous passage to prevent, as far as possible, the escape of steam. A ring $l$ is carried by the casing $c$, forming therewith a chamber $e$, which surrounds the shaft $a$, a passage $g$ between the shaft $a$ and ring $b$ being packed in any usual manner or left unpacked as may be desired. The inner edge $l'$ of the ring $l$ and the adjacent inner flange $b'$ on a packing ring $b$ are beveled to form an outlet for the passage $g$ into the contracted inlet to the chamber $e$, through which steam escapes from the tortuous passage formed by the rings $b$ and $d$. A pipe $f$ is connected with the chamber $e$ and leads, suitably, to the outer air.

In operation, steam escaping through the packing is delivered to the chamber $e$ by way of the contracted inlet thereof, whereby suction is effected upon the channel $g$ and there is no escape of fluid therethrough, the lines of force of the currents being indicated by the line $d'$.

In the apparatus shown in Figs. 2 and 5, the packing consists of the parallel rings $b''$ and $d''$ fixed respectively to the shaft $a$ and turbine casing $c$. A ring $l''$ is fixed to the casing $c$ and forms a channel $e'$. Steam escaping from the packing into the channel $e'$ creates suction through the passage formed by the exterior ring $b''$ and the adjacent part of the ring $l''$.

In Fig. 3, the passage between the turbine casing $c$ and shaft $a$ is shown packed with graphite $h$. Steam escaping past this packing is delivered to the chamber $e'''$ through the contracted inlet thereto which creates suction through the passage $g$ between the shaft $a$ and the ring $l'''$ providing the chamber $e'''$.

In Fig. 6 is shown a shaft $a$ revoluble within the casing $c$ to which is fixed the ring $l^4$ forming the chamber $e^4$. Steam escaping between the shaft $a$ and casing $c$ into the chamber $e^4$ creates suction between the shaft $a$ and the ring $l^4$.

Having described my invention, I claim:

1. A casing, a shaft movable therein, and a chamber having a contracted inlet through which fluid escaping between said shaft and casing is delivered to said chamber.

2. In combination with shaft packing means, a passage having a contracted section connected with said means, and a passage leading from the atmosphere to said contracted section.

3. The combination of a shaft, a casing in which said shaft is journaled, means providing a chamber surrounding said shaft, said chamber having a contracted inlet communicating with the space between said shaft and casing, and a passage between said shaft and means in which suction is created by fluid flowing through said inlet to said chamber.

In testimony whereof I have signed my name to this specification in the presence of two subscribing witnesses.

BIRGER LJUNGSTRÖM.

Witnesses:
HARRY ARLIELEN,
HEDING MELINDER.